May 30, 1933.  J. GALBRAITH  1,911,891
CARVING MACHINE
Filed April 30, 1928
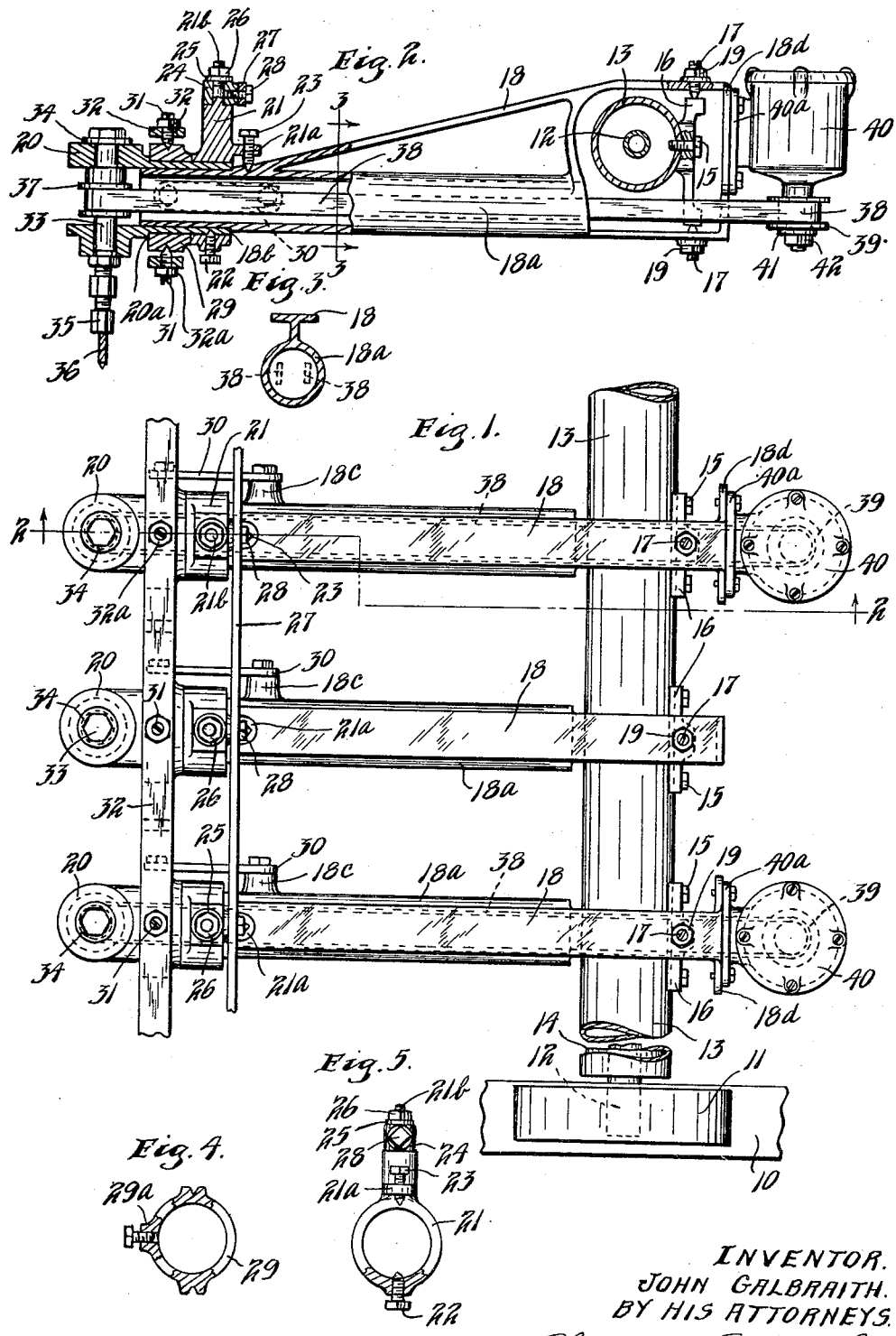
INVENTOR.
JOHN GALBRAITH.
BY HIS ATTORNEYS.

Patented May 30, 1933

1,911,891

UNITED STATES PATENT OFFICE

JOHN GALBRAITH, OF MINNEAPOLIS, MINNESOTA

CARVING MACHINE

Application filed April 30, 1928. Serial No. 273,909.

This invention relates to a carving machine such as used for carving patterns in wood and similar materials, and in which a plurality of articles are simultaneously carved. In such machines a plurality of cutting tools are used, which are moved in unison, the operator controlling these tools and moving the same by moving a tracer tool over a model or pattern having the desired contour of the piece to be carved.

It is an object of this invention, therefore, to provide a carving machine having a plurality of tool heads, each of which is carried on a swinging arm, said arms being mounted for movement in unison, and said heads being mounted for movement about axes extending respectively longitudinally of said arms.

It is a further object of the invention to provide a carving machine comprising a plurality of tool carrying heads, each carried on an individual arm, said heads being mounted for movement relatively to said arms.

It is still another object of the invention to provide a carving machine comprising a plurality of tools each carried on a separate swinging arm, which arms are swingingly mounted on a common member which is movable forwardly and rearwardly, said heads each being movable relatively to its respective arms, and means connecting said heads for simultaneous movement.

It is a still further object of the invention to provide a carving machine comprising a plurality of swinging arms, each of which has a tool head at its forward portion with a tool journaled therein, said tool having a driving means thereon, and means extending through said arm engaging said driving means for rotating said tool.

These and other objects and advantages of the invention will be fully set forth in the following description made in connection with the accompanying drawing, in which like reference characters refer to similar parts throughout the several views and in which:—

Fig. 1 is a plan view of a portion of the machine showing several of the arms used;

Fig. 2 is a vertical section on line 2—2 of Fig. 1 as indicated by the arrows;

Fig. 3 is a vertical section on line 3—3 of Fig. 2, as indicated by the arrows;

Fig. 4 is a view in side elevation of a holding collar used; and,

Fig. 5 is a view in elevation of one of the parts used.

Referring to the drawing, a carving machine is shown comprising a frame, only a small portion of which is shown, which portion comprises a substantially horizontal track or runway 10 on which runs a roller 11. The frame of the machine comprises one of the runways 10 at each end, and the rollers 11 supported and moving thereon are connected by a shaft 12 extending therebetween and secured thereto. A comparatively large pipe 13 is supported on shaft 12 by suitable bearings 14, preferably of the ball type, whereby this pipe can be moved forwardly and rearwardly of the machine on the rollers 11 and is also rotatable about its own axis on the bearings 14. The member 13 has bolted to its rear side by the bolts 15 the spaced brackets 16. The brackets 16 have upper and lower substantially horizontal surfaces which have alined small depressions therein adapted to receive the points of screws 17 having their axes in vertical alinement and passing respectively through the top and bottom portions of the arm 18, said screws being held in place by jamb nuts 19. The arm 18 is thus pivoted to bracket 16 for swinging movement in a horizontal plane about the axes of screws 17. The arm 18 has its lower portion 18a formed as a tube and the forward end of said arm is turned to a reduced diameter forming a shoulder 18b. A tool carrying head 20 has a rearwardly extending cylindrical portion journaled on said reduced portion of arm 18 and having its rear end abutting against shoulder 18b. Said head 20 is embraced at its rear portion by a member 21 having a small boss at its bottom portion, through which extends a set screw 22, said set screw engaging member 20 so that member 21 is rigidly secured thereto. Member 21 above arm 18 has a rearwardly projecting lug 21a through which extends a set screw 23, said set screw engaging the top of arm 18 whereby said member 21 and thus head 20 are held in stationary position relatively to the arm 18. If it is desired to swing the head 20 relatively to said arm, the set screw 23 must be loosened and said head could also be set in a different position relatively to arm 18 and held in said position by set screw 23. The upper portion 21b of member 21 is considerably reduced in diameter and a collar 24 is journaled on this reduced portion, being held in place by a washer 25 and a surmounting nut 26 threaded onto the end of portion 21b. As shown in Fig. 1 and as above stated, there are a plurality of arms 18 and the collars 24 on these various arms are connected by a link bar 27 pivoted to said collars by the screws 28. When the set screws 23 are loosened, it will be seen that the bar 27 can be moved longitudinally and all of the members 21 will thus be swung about the axes of portions 18a of arms 18. The tool heads 20 have a shoulder 20a thereon and a collar 29 surrounds head 20 between said shoulder and the front portion of member 21. Each collar 29 is provided with a laterally projecting boss 29a and a short link 30 is bolted to said boss, which link extends rearwardly and is bolted at its other end to a laterally projecting boss 18c on arm 18. It will be seen that these links 30 hold collars 29 from outward movement, which collars in turn hold the members 21 and heads 20 from outward movement. Each collar 29 is provided with bosses at its top and bottom, having small conical depressions therein adapted to receive the screws 31 having their axes in vertical alinement, which extend through top and bottom bars 32 of the yoke member or bar extending between various arms 18. The screws 31 are held in place by the jamb nuts 32a. The members 20 have journaled therein tool spindles 33 having at their top the caps 34 and being provided at their lower ends with tool holding chucks 35 in which are secured the carving tools 36. As shown in Fig. 2, head 20 has upper and lower portions between which the tool spindles 33 are provided with flanged pulleys 37. A belt 38 runs over the pulley 37 and extends rearwardly through the tubular portion 18a of arm 18 and through the open rear portion of said arm, said belt then passing over a flanged pulley 39 secured to the armature shaft of motor 40. The motor 40 as shown in Figs. 1 and 2 has a flange 40a which is bolted to the flange 18d formed at the rear end of arm 18. Pulley 39 is held in place by the collar 41 and a nut 42 threaded on the end of said motor shaft.

The machine described and illustrated in this application is of the general type disclosed and claimed in applicant's Patent 1,721,015, granted July 16, 1929, and like said machine in the latter application will be provided with work holding means and various adjustments therefor. The work to be carved, as well as the pattern, is held on the work holding table or on work holding centers depending on whether it is to be flat work or round work respectively. Current is supplied to the motor 40 and the tools 36 are thus driven through the belts 38. The operator holds the tracer tool on one of the arms such as the middle arm shown in Fig. 1 and moves the tracer tool over the pattern. The tool can be quite easily moved forwardly and rearwardly, the arms and member 13 moving with rollers 11, and the tool can readily be swung laterally, the arms swinging about the axes of screws 17. It will be noted that through the connection with the yoke bar 32, all of the arms simultaneously swing together, the pivot screws 31 accommodating this movement. The arms can also be swung vertically simultaneously, the same rocking with shaft 13 which swings on its bearings 14. As the operator moves the tracer tool about over the pattern, the cutting tools 36 cut a similar pattern in the blank material which is supported under the tools. It is sometimes necessary to have undercut portions on the patterns, necessitating the cutting tool being positioned at an angle to the vertical. It will be seen that by loosening the screws 23 the heads 20 can be rotated about their longitudinal axes or the axes of their tubular portions and as the head on the arm carrying the tracer tool is moved, the other heads will be simultaneously moved through the link bar 27. The heads 20 and the tools could be swung to quite an angle, as the axis about which the same move is substantially the central axis between the runs of belt 38. Work which requires undercutting can thus readily be done on the present machine and the machine is thus practically a universal one.

From the above description it is seen that applicant has provided a very simple and efficient carving machine comprising a plurality of independently mounted arms, each carrying a tool head which can be simultaneously moved in various directions. There is a distinct advantage in a machine which has the tools and tool carrying heads in separate arms. It has heretofore been a practice to have these heads in a bar. With this construction the bar becomes heated during the day when the machine is being operated and the expansion of the bar changes the distance between the tools sufficiently to make quite a different in the work, and to give objectionable results in the finished forms or patterns cut. This objection is entirely overcome by having the tools in independently mounted arms. It is obvious that the device will have great utility for the purpose intended.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A carving machine having in combination, a frame, an arm mounted on said frame and arranged for movement forwardly and rearwardly of said frame and pivotally mounted for lateral swinging movements, said arm having a tubular forward portion, a tool carrying tubular head rotatably mounted on said forward portion of said arm for oscillation about the axis of said tubular portion, a tool spindle carried in said head, a driving means on said spindle, and a driving means for said last mentioned driving means extending through the tubular portion of said arm.

2. A carving machine having in combination, a frame, an arm mounted on said frame and arranged for movement forwardly and rearwardly of said frame and pivotally mounted for lateral swinging movements, said arm having a tubular forward portion, a tool carrying head mounted on said forward portion for oscillation about the axis of said tubular portion, a tool spindle carried in said head, a pulley on said spindle, and a belt passing over said pulley and through the tubular portion of said arm.

3. A carving machine having in combination, a frame, an arm mounted on said frame and arranged for movement forwardly and rearwardly of said frame and pivotally mounted for lateral swinging movements, said arm having a tubular forward portion, a tool carrying head mounted on said forward portion for oscillation about the axis of said tubular portion, a tool spindle carried in said head, a pulley on said spindle, a motor secured to the rear end of said arm, a pulley carried by said motor, and a belt passing over said pulleys and passing through the tubular portion of said arm.

4. A carving machine having in combination, a frame, a tool carrying arm on said frame mounted for forward and rearward movement, in a horizontal plane and pivoted for lateral movement and vertically oscillating movement, said arm being hollow, a driving means carried on the rear end of said arm, a tool carrying head at the forward end of said arm and oscillatable on the arm, a spindle in said head, a driving means on said spindle, and a driving means connecting said first mentioned and last mentioned driving means and extending through the hollow portion of said arm.

5. A carving machine having in combination, a plurality of spaced arms, each pivotally mounted for lateral swinging movement, each of said arms having a cylindrical portion at its forward end, a tool carrying head journaled on said cylindrical portion of each of said arms, a member secured to said tool head at the rear portion thereof, a member embracing said tool head in front of said last mentioned member, means connecting said last mentioned member to said arm for holding the member from forward movement and thus holding the first mentioned member and tool head from forward movement.

6. The structure set forth in claim 5, means connecting the last mentioned members of each of said arms and connected thereto by vertical pivots, whereby all of said arms may be swung laterally in unison.

7. The structure set forth in claim 5 and a member connecting all of the first mentioned members of said arms whereby all of said members may be rotated about the axis of the cylindrical portion of said arm together with said tool heads.

8. The structure set forth in claim 5 and means on said first mentioned member adapted to engage said arm for holding said first mentioned member and tool head in different positions about the horizontal axis of the cylindrical portion of said arm.

9. A carving machine having in combination a track, a frame movable in a plane forwardly and rearwardly on said track, a tool carrying arm pivotally mounted on said frame on axes extending at right angles to each other, said arm having a cylindrical portion at the forward end thereof, and a tool head having an encircling cylindrical portion and oscillatably mounted on said portion.

10. The structure set forth in claim 9, said arm having a longitudinal passage therethrough, a tool spindle carried in said tool head, a pulley on said spindle, and a belt passing over said pulley and extending through the said passage in said arm.

11. A carving machine having arms and tool carrying members each oscillatable on the end of an arm, collars on the oscillatable tool carrying members, a bar with connections to the collars, members rigidly attached to the tool carrying members and a bar pivotally attached to said members.

In testimony whereof I affix my signature.

JOHN GALBRAITH.